United States Patent [19]

Wagh et al.

[11] Patent Number: 5,645,518
[45] Date of Patent: Jul. 8, 1997

[54] METHOD FOR STABILIZING LOW-LEVEL MIXED WASTES AT ROOM TEMPERATURE

[75] Inventors: Arun S. Wagh, Joliet; Dileep Singh, Westmont, both of Ill.

[73] Assignee: The University of Chicago, Chicago, Ill.

[21] Appl. No.: 380,922

[22] Filed: Jan. 31, 1995

[51] Int. Cl.$^6$ .............................. A62D 3/00; B09B 3/00; G21F 9/00
[52] U.S. Cl. .................. 588/252; 501/155; 588/18; 588/256
[58] Field of Search .................. 588/249, 252, 588/256, 18; 405/128, 129; 106/697; 210/751; 501/155

[56] References Cited

U.S. PATENT DOCUMENTS

| | | | |
|---|---|---|---|
| 4,049,462 | 9/1977 | Cocozza | 588/252 |
| 4,351,749 | 9/1982 | Ropp | 588/11 |
| 4,436,555 | 3/1984 | Sugama et al. | |
| 4,460,500 | 7/1984 | Hultgren | 588/10 |
| 4,620,947 | 11/1986 | Carlson | 533/4 |
| 5,198,190 | 3/1993 | Philipp et al. | 423/DIG. 18 X |
| 5,202,033 | 4/1993 | Stanforth et al. | 588/256 X |
| 5,246,496 | 9/1993 | Sugama | 106/690 |
| 5,302,565 | 4/1994 | Crowe | 501/141 |

OTHER PUBLICATIONS

Low-Temperature-Setting Phosphate Ceramics for Stabilizing DOE Problem Low-Level Mixed Waste (Part I –Material & Waste Form Development –Dileep Singh, Arun S. Wagh and Lerry Knox) and Part II Low-Temperature-Setting Phosphate Ceramics for Stabilizing DOE Problem Low-Level Mixed Waste (Performance Studies on Final Waste Foms) –Arun S. Wagh, Dileep Singh, Manish Sutaria, and Sara Kurokawa –Proceedings of Waste Management 94 Conference–Tucson, AZ –Feb. 17–Mar. 3 1994–26 pages.

Stabilization of Low Level Mixed Waste In Chemically Bonded Phosphate Ceramics –Arun s. Wagh; Dileep singh and J. Cunnane –Spectrum 1994 "Nuclear and Hazardous Waste Management International Topical Meeting"–Atlanta, GA.–Aug. 14–18 –4 pages.

Phosphate–Bonded Ceramics as Candidate Final–Waste-–Form Materials –D. Singh, A.S. Wagh, J. Cunnane, M. Sutaria & S. Kurokawa –Proceedings of 96th Annual Meeting of the American Ceramic Society, Indianapolis, IN, –April 24–28, 1994 –11 pages.

Low–Temperature–Setting Phosphate Ceramics for Mixed Waste Stabilization –Arun S. Wagh & Dileep Singh –Proceedings of Second International Symposium and Exhibition on Environmental Contamination in Central and Eastern Europe, Budapest, Hungary, Sep. 20–23 1994 –12 pages.

Conner, Jesse R., *Chemical Fixation And Solidification of Hazardous Wastes*, Van Nostrand Reinhold, 1990, p. 299–303.

*Primary Examiner*—George A. Suchfield
*Attorney, Agent, or Firm*—Cherskov & Flaynik

[57] ABSTRACT

A method to stabilize solid and liquid waste at room temperature is provided comprising combining solid waste with a starter oxide to obtain a powder, contacting the powder with an acid solution to create a slurry, said acid solution containing the liquid waste, shaping the now-mixed slurry into a predetermined form, and allowing the now-formed slurry to set. The invention also provides for a method to encapsulate and stabilize waste containing cesium comprising combining the waste with $Zr(OH)_4$ to create a solid-phase mixture, mixing phosphoric acid with the solid-phase mixture to create a slurry, subjecting the slurry to pressure; and allowing the now pressurized slurry to set. Lastly, the invention provides for a method to stabilize liquid waste, comprising supplying a powder containing magnesium, sodium and phosphate in predetermined proportions, mixing said powder with the liquid waste, such as tritium, and allowing the resulting slurry to set.

27 Claims, 2 Drawing Sheets

5,645,518

METHOD FOR STABILIZING LOW-LEVEL MIXED WASTES AT ROOM TEMPERATURE

The United States Government has rights in this invention pursuant to Contract No. W-31-109-ENG-38 between the U.S. Department of Energy and the University of Chicago, representing Argonne National Laboratory

BACKGROUND OF THE INVENTION

1. Field of the Invention

This invention relates to a material to stabilize waste and a method of producing the material, and more specifically, this invention relates to a ceramic material to stabilize low-level mixed wastes and a method for producing the ceramic material.

2. Background of the Invention

Low-level mixed wastes contain hazardous chemical and low-level radioactive materials. Generally, mixed waste streams contain aqueous liquids, heterogeneous debris, inorganic sludges and particulates, organic liquids and soils. The projected volume over the next five years of the mixed waste generated by the U.S. Department of Energy alone is estimated at approximately 1.2 million cubic meters.

Stabilization of these mixed wastes requires that both phases of contaminants are stabilized effectively.

Typical approaches to stabilization and storage of these mixed wastes include vitrification. For example, one process (Crowe, U.S. Pat. No. 5,302,565) requires firing temperatures of at least 1850° C. for at least 12 hours to produce ceramic containers. However, such processes, associated with high temperatures are costly. In addition, vitrification of waste streams often result in the lighting off of volatile components which often are contained in the waste stream. This lighting off results in the unwanted generation of secondary waste streams.

One system for producing cements having ceramic type properties, does not require high temperatures for final crystallization (Sugama et al. U.S. Pat. No. 4,436,555, assigned to the instant assignee). However, that process results in ammonia being liberated during processing and storage, which leads to container corrosion.

A need exists in the art for a low level waste encapsulation technology that connotes relatively high strength and low porosity to the final product, and which also sets up at low temperatures. The final product must exhibit low leachability and high durability in aqueous systems.

SUMMARY OF THE INVENTION

An object of the present invention is to overcome many of the disadvantages of the prior art in the encapsulation and stabilization of mixed low-level wastes.

Another object of the present invention is to provide a ceramic to encapsulate and stabilize mixed low-level wastes. A feature of the invention is the utilization of readily available materials. An advantage of the invention is the low cost of production of these ceramics.

Yet another object of the present invention is to provide a method for using chemically bonded phosphate ceramics to stabilize mixed waste forms. A feature of the present invention is the fabrication of these ceramics at room temperatures. An advantage of the present invention is that the low temperature setting characteristics of these ceramics makes them suitable for stabilization of mixed wastes containing volatile compounds, without the generation of secondary waste streams.

Still another object of the present invention is to provide a method for producing phosphate ceramics for use as waste stabilizers. A feature of the present invention is the fabrication of these ceramics via acid-base reactions between an inorganic oxide and a phosphate-containing acid solution. An advantage of the present invention is the ability to treat both solid and liquid wastes, while also obviating the need for high temperature vitrification processes, and therefore reducing the costs of final waste forms production.

Another object of the present invention is to provide for a method to minimize bulk of final waste forms. A feature of the present invention is the utilization of liquid and/or solid waste fractions to produce chemically bonded ceramic forms. An advantage of the invention is the economic and environmental savings of bulk reduction.

Briefly, the present invention provides for a method to stabilize solid and liquid waste at room temperature comprising grinding the solid waste to a predetermined particle size, combining the now ground solid waste with a starter oxide to obtain a powder, contacting the powder with an acid solution to create a slurry, said acid solution containing the liquid waste, mixing the slurry while maintaining the slurry below a predetermined temperature, shaping the now-mixed slurry into a predetermined form, and allowing the now-formed slurry to set.

The invention also provides for a method to encapsulate and stabilize waste containing cesium comprising combining the waste with $Zr(OH)_4$ to create a solid-phase mixture, grinding said solid-phase mixture, mixing phosphoric acid with the solid-phase mixture to create a slurry, shaping the now-mixed slurry into a predetermined form, subjecting the now-shaped slurry to pressure; and allowing the now pressurized slurry to set.

In addition, the invention provides for a method to stabilize liquid waste comprising supplying a powder containing magnesium, sodium and phosphate in predetermined proportions, mixing said powder with the liquid waste to produce a slurry, forming the slurry into a predetermined shape, and allowing the now-shaped slurry to set.

BRIEF DESCRIPTION OF THE DRAWING

These and other objects and advantages of the present invention will become readily apparent upon consideration of the following detailed description and attached drawing, wherein.

DETAILED DESCRIPTION OF THE INVENTION

Figure 1:
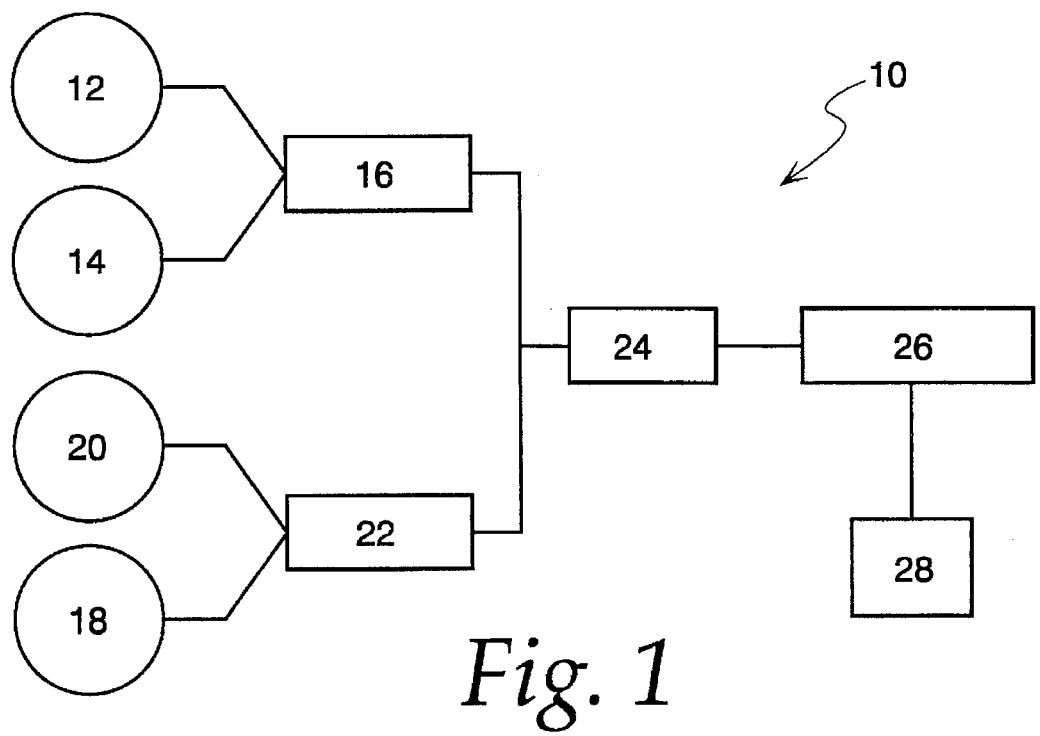
FIG. 1 is a schematic diagram of a method for producing ceramic waste forms, in accordance with the features of the present invention.

This invention addresses the need to develop benign final waste forms for a wide variety of waste streams, said waste streams containing pyrophorics, volatiles, such as mercury, lead, cadmium, chromium, and nickel, and other unstable compounds which cannot be treated by conventional high temperature techniques such as vitrification. The invention is also applicable to stabilize secondary waste streams resulting from thermal treatment processes, such as vitrification and plasma hearth processes.

The invention also can be used to stabilize certain RCRA organics. The inventors have found that certain of these organics do not retard the setting of phosphate ceramics. In one scenario, organics such as naphthalene and dichlorobenzene are trapped in activated carbon which in turn is stabilized in the phosphate matrix by the method claimed herein. This method of stabilization can be utilized in situations wherein mixed waste contains trace amounts of organics such as polychlorinated biphenyls, dioxin, dichlorobenzene, naphthalene, among others. As such, the invented method is superior to encapsulation methods wherein cement is utilized, in that cement cannot stabilize in the presence of organics.

Ash waste may be consolidated by this process to 80 volume percent of its original volume. Experiments by the inventors show good reaction and bonding between amorphous and reactive silica from fly ash and bottom ash with phosphate matrix. Formation of hard silico-phosphate bonds via this reaction can be used for the stabilization of hazardous silica compounds such as asbestos. The invention also encapsulates and stabilizes silica based filter aids, such as vermiculites and perlites, which are used in the removal of contaminants from liquid waste streams.

The inventors have identified a number of phosphate systems, which form into hard ceramics via chemical bonding, that can stabilize contaminants by both chemical and physical means. The process needs no thermal treatment, resulting in waste stabilization being done economically on site and without capital intensive equipment and transportation costs.

The room-temperature setting phosphate ceramic waste forms are formulated by using a route of acid-base reactions. Oxides or hydroxides of various elements are used as starter powders for this purpose. Said oxides and hydroxides chemically react with phosphoric acid or soluble acid phosphates to form ceramics. When waste is mixed with these powders or acid components, the waste also participates to form various stable phases in the final reaction product which then may be set into ceramic waste forms.

In one instance, the acid-base reaction results in the formation of the phosphate of MgO (Newberyite) via the following equation:

$$MgO + H_3PO_4 + 2H_2O \rightarrow MgHPO_4 \cdot 3H_2O \qquad \text{Equation 1}$$

The acid base reaction also results in the reaction of the waste components with the acid or acid-phosphates. These reactions lead to chemical solidification of the waste. In addition, encapsulation of the waste in the phosphate ceramics formed by the reaction products results in physical encapsulation of the waste components.

Several advantages in phosphate waste forms exist viz portland cement grout or polymer encapsulation techniques. Since the stabilization in chemically bonded ceramics is due to chemical solidification as well as physical encapsulation, the leaching characteristics of these final waste forms is superior to the above-identified waste forms which are dependent on only physical encapsulation. The setting in chemically bonded ceramics can occur in a wide pH range and hence is not very sensitive to pH of the waste. Further, setting reactions are not sensitive to ambient temperatures and hence open-field stabilization in cold climates is possible.

The bonds are either ionic or covalent in phosphate ceramics, and hence they are stronger than the hydration bonds in portland cement thereby providing better strength to the final product.

The results on chemical stabilization presented infra are very general, given that in these acid-base systems, the acid phosphates seem to react with the contaminants irrespective of the bulk composition of the waste stream. This translates into a wide application in the stabilization of different types of waste streams.

Several phosphate systems can be used for the stabilization of chemical, radioactive and mixed waste streams. These include, but are not limited to, phosphates of Mg, Mg—Na, Al, Ca, Fe and Zr. The acid component may be concentrated or dilute phosphoric acid or acid phosphate solutions such as dibasic or tribasic sodium or aluminum phosphates. The reactions are exothermic and require no external heat treatment. However, the paste-setting reactions can be controlled either by the addition of boric acid to reduce the reaction rate, or by controlling the rate of addition of powder to the acid while concomitantly controlling the temperature of the reaction vessel. The setting times for the pastes formed by the reaction ranges from a few hours to a week. The phosphates attain their full strength in approximately three weeks.

The various invented systems include those outlined in Table 1, below:

TABLE 1

Phosphate Systems and Processing Details

| System | Starting Materials | Solution | Curing Time |
| --- | --- | --- | --- |
| Mg phosphate | Calcined MgO | Phosphoric acid-water (50/50) | >8 days |
| Mg—NH$_4$ phosphate | Crushed dibasic NH$_4$ phosphate crystals mixed w. calcined MgO | Water | 21 days |
| Mg—Na phosphate | Crushed dibasic Na phosphate crystals mixed with calcined MgO | Water | 21 days |
| Al phosphate | Al(OH)$_3$ powder | Phosphoric acid ($\approx$60° C.) | Reacted powder, pressed |
| Zr phosphate | Zr(OH)$_4$ powder | Phosphoric acid | 21 days |

The five systems disclosed in Table 1 were chosen for ready availability of materials, low cost, and availability of literature on the materials.

Three waste streams were selected for treatment: ash waste, contaminated cement sludge, and salts dominated by carbonates. Each of the waste streams differs in their bulk composition, with the bulk compositions forming nearly 91 weight percent of the total waste streams. Representative bulk constituents for the ash waste stream sample include activated carbon, fly ash, coal ash and vermiculite. 3Representative bulk constituents for the salt waste include activated carbon, Na$_2$(CO$_3$)$_2$, widely used cation or anion exchange resins (such as Purolite), water, NaCl, Na(NO$_3$)$_2$, Na$_3$PO$_4$, Na$_2$SO$_4$. Representative bulk constituents for the cement sludge waste include activated carbon, fly ash, water, concrete, Plaster of Paris, Haematite (Fe$_2$O$_3$), alumina and perlite.

Each of these waste streams was spiked to a level of approximately 0.5 weight percent, with heavy metals, said metals added in the form of soluble nitrates. Total nitrate content was approximately 7 weight percent of the total waste. The heavy metals included Cr, Ni, Pb, and Cd. The invented method can stabilize and encapsulate high heavy metal concentrations (for example, exceeding 2 percent); however, most metal concentrations encountered are one percent or less, with economics dictating the reclamation of anything above one percent.

While a myriad of salts are encountered during waste processing, the above identified metals were added for demonstration purposes via solubilization to the following RCRA nitrates:

$Cr(NO_3).6H_2O$, $Ni(NO_3).6H_2O$, $Pb(NO_3)_2$, and $Cd(NO_3)_2.4H_2O$.

RCRA organics added to the three waste streams included naphthalene ($C_{10}H_8$), and dichlorobenzene ($C_6H_4Cl_2$). These organics were added to see their effect on the stabilization process. A radionuclide surrogate CsCl was also added to each of the three waste mixtures.

The heavy metals, organics and radionuclide examples disclosed above are meant to serve merely as representative of the variety of such compounds that could be encapsulated and stabilized, given the myriad of mixed waste scenarios to which the invented product and method could be applied.

Oxide and Hydroxide Preparation

Oxide powders can be pretreated for better reactions with acids. One technique includes calcining the powders to a typical temperature of between approximately 1,200° C. and 1,500° C. and more typically 1,300° C. Another reaction enhancement technique is washing the powders with dilute nitric acid and then water. A myriad of oxide and hydroxide powders can be utilized to produce the ceramic system, including but not limited to MgO, $Al(OH)_3$, CaO, FeO, $Fe_2O_3$, $Fe_3O_4$ and $Zr(OH)_4$.

MgO and $Al(OH)_3$ powders are available through any commercial supply house, such as Baxter Scientific Products, McGaw Park, Ill. $Zr(OH)_4$ is obtained through Atomergic Chemetals Corporation, Farmingdale, N.Y. The myriad iron oxides enumerated above could actually be supplied as part of the waste stream to be stabilized and encapsulated.

Waste Processing Detail

Both solid and liquid wastes are treated by the invented process of using acid-base reactions. An exemplary process is depicted in FIG. 1., designated generally as numeral 10. Solid waste 12, such as contaminated ash, cement, medical waste, may first be crushed and mixed with the starter powder, 14, (Table 1, "Starting Materials"), via a vibratory mixer, 16. The resulting mixture is then reacted with the solution, 18, (Table 1, "Solution") to form a slurry or paste. If the waste is a liquid, 20, said liquid 20 is mixed with the solution 18 in a standard splash mixer 22 and then the mixture is reacted with the powder-mix in a reaction chamber 24.

After reaction, the reaction liquor is allowed to stabilize in a stabilization unit 26. The setting or stabilization step 26 takes from a few hours to a week. Final waste forms 28 are obtained in approximately 3 weeks.

Solid Waste Processing:

In the solid waste processing scenarios depicted in Table 1, the waste streams were manipulated in powder form by grinding the waste to an average, preferable approximate particle size of 8 to 10 micrometers (μm). However, particles can range in size from between approximately 4–75 μm.

Ash and cement wastes can be first mixed with the starter oxide or hydroxide powders using a vibratory shaker, or any conventional agitator. Weight percentages of the mixture varies at this juncture, but can range from between approximately 15 percent oxide to 50 percent oxide. Typically, an even weight percent (50:50) of oxide to solid waste is sought. However, the inventors have successfully encapsulated and stabilized single-component fly ash at weight percents as high as 85 percent ash to 15 percent MgO powder, which makes this technique particularly attractive for utilities where single-component fly ash is a major land-filling problem.

Unlike ash and cement waste, salt waste is reacted first with phosphoric acid to consume the $CO_2$ that is formed via the reaction depicted in equation 2, below, and then mixed with the starting powder. Otherwise, the evolution of $CO_2$ gas during stabilization results in very porous ceramic waste forms being produced.

$$Na_2CO_3+H_2O \rightarrow 2NaOH+CO_2\uparrow \qquad \text{Equation 2.}$$

In all three processing scenarios, the resulting powders are slowly added to the respective acid solution and thoroughly mixed using a mixer. Mixing can occur at ambient temperatures.

Typically, the rate of powder addition to the acid solution should result in the reaction liquor being maintained at less than 100° C. Typical times required for controlled mixing range from 30 minutes to 1 hour. Mixing times can be shortened if the heat from resulting exothermic reactions, associated with the above method, is dissipated via reaction vessel cooling. The inventors found that reaction vessel cooling is more likely to be necessary when the resulting oxide powder-solid waste mixture contains less than 50 weight percent of waste.

Alternatively, the reaction can be slowed with the addition of from 5 to 25 weight percent of boric acid in the powder, and preferably 15 weight percent.

Upon temperature equilibration, the reacted paste is a liquid slurry which sets in a few hours once poured into a mold. Typically, no pressure is applied to the now-molded slurry. However, in some processing scenarios, such as when zirconium-based powders are utilized, discussed infra, pressures in the range of 1,000 to 2,000 pounds per square inch are used. The slurry gains full strength in approximately one week.

Mold shapes can vary, depending on the configuration of the ultimate deposition site, and can be selected from a myriad of geometrical shapes including cuboid, pyramidal, spherical, planar, conical, cylindrical, trapezoidal, rectangular, and the like. Generally, molds having the shape and size of a typical 55 gallon drum are used.

In the case of zirconium phosphate, the slurry is allowed to thicken first and then pressed into uniform shapes in a mold at low pressures. Set times for zirconium systems are approximately 3 weeks and requires initial pressure to achieve a dense form. While this additional processing time may seem to detract from using zirconium phosphate in the invented encapsulation method, surprisingly and unexpectedly the inventors have found that this phosphate provides orders of magnitude better encapsulation of cesium viz-a-viz the other phosphates. For example, while cesium leaching results from Mg-Phosphate and Mg—Na phosphate waste forms yielded low levels of 11.1 parts per million and 23 parts per million respectively, leaching levels obtained when using Zr phosphate waste forms were 0.26 parts per million.

Liquid Waste Forms:

The invented liquid encapsulation method provides a simplified approach for an end user compared to more typical encapsulation methods. For example, Mg—Na phosphates systems are made by adding said phosphate to the liquid on site, a process similar to that practiced in the cement industry. As such, liquid wastes, such as tritiated water, are easily and economically encapsulated with this procedure.

If solely liquid is being encapsulated and stabilized by the invented method and product, the liquid is first combined with an acid, such as phosphoric acid. The inventors have found that the ratio of acid to water, selected from a range of between approximately 37:63 to 50:50, produces good results. An acid:water ratio of 50:50 is most preferred. If the liquid waste contains water, then correspondingly less water is added to the acid to bring the water weight percent of the liquid waste-acid mixture up to 50 percent. The resulting liquid waste-acid mixture is then mixed with oxide powder in weight percent ranges similar to those outlined above for solid waste processing. When using powder mixtures containing MgO and dibasic phosphate, weight percent ratios of the oxide to the phosphate selected from the range of approximately 87:13 to 77:23 produce good results.

Physical and Mechanical Properties

The physical properties most relevant to the final waste forms are density, porosity and compression strength. Density of the samples was measured by determining the mass and geometrical volume. Porosity values were obtained by water immersion. Compression strength was measured using an Instron™ machine in compression mode, or other similar compression strength machine. The results of these measurements are depicted in Table 2, below.

Overall, the product waste forms are light weight materials having very low density. Very low porosity in Mg phosphate waste forms with ash waste was attained. High loading, in the range of approximately 50–80 percent was observed for the Magnesium systems.

Strength of the waste forms in the Mg phosphate system with ash waste does not depend on waste loading, and in fact is higher than other room temperature setting materials, such as Portland Cement (approx. 6,500 vs. 5,750 psi at 50 percent weight loading and 7000 vs. 2000 psi at 70 percent). All of these values well exceed the minimum statutory land disposal compression value of 500 psi for final waste forms.

TABLE 2

Physical Properties and Compression Strength of Waste Forms

| Matrix Material | Waste Loading (Wt %) | Density (g/cm$^3$) | Porosity (Vol %) | Compression Strength (psi) |
|---|---|---|---|---|
| Mg phosphate w. ash waste | 50–70 | 1.706–1.756 | <5 | 6223–6787 |
| Mg phosphate w. cement waste | 50–70 | 1.26–1.32 | 29.4–38.7 | 2224–5809 |
| Mg phosphate w. salt waste | 50–70 | 1.239–1.319 | 29.4–34.3 | 2224–5809 |
| Mg—Na phosphate w. ash waste | 50–70 | 1.285–1.436 | 36.8–49.6 | 1172–1573 |
| Zr phosphate w. ash waste | 20 | | 16 | 7572 |

Leaching Detail

All of the invented phosphate systems are very effective in stabilizing heavy metal contaminants. As Table 3, depicts below, a comparison between the leaching levels for the untreated waste and the stabilized samples shows that the leaching levels in the stabilized waste are by an order of magnitude lower than those for the untreated waste. The data also show that the leaching values, even at a high loading of 70 weight percent, are from one to two orders of magnitude below the regulatory limits established for these metals.

The superior immobilization is due to the chemical stabilization of the contaminants in the matrix. This chemical stabilization results from the reaction between contaminant metal salts and the acid solution, followed by the physical encapsulation within the dense phosphate matrix. The nitrates of heavy metals are converted to insoluble phosphates by chemical reactions and hence they do not leach into the acidic leachate water used in the Toxicity Characteristics Leaching Procedure (TCLP) of the EPA. The physical encapsulation also immobilizes the contaminants in the matrix, thereby providing an excellent final waste form for long term storage.

TABLE 3

TCLP Data on Waste Streams Treated With Invented Ceramic Materials

| | Contamination levels (ppm) | | | |
|---|---|---|---|---|
| Sample Specification | Cd | Cr | Ni | Pb |
| Ash waste (neat) | 40.4 | 196 | 186 | 99.7 |
| Ash w H$_3$PO$_4$ | 1.5 | 0.12 | 57.5 | <0.5 |
| MgP w. 50% ash | 0.09 | <0.05 | 0.21 | <0.2 |
| MgP w. 60% ash | 0.12 | <0.05 | 1.27 | <0.2 |
| MgP w. 70% ash | 0.06 | <0.05 | 3.71 | <0.2 |
| MNP w. 50% ash | 0.03 | 0.12 | 0.04 | <0.2 |
| MNP w. 60% ash | 0.06 | 0.11 | 0.05 | <0.2 |
| MNP w. 70% ash | 0.13 | 0.12 | 0.08 | <0.2 |
| MgP w. 50% cement | 0.03 | <0.05 | 0.13 | <0.2 |
| MgP w. 60% cement | 0.04 | <0.05 | 0.26 | <0.2 |
| MgP w. 70% cement | 0.06 | <0.05 | 0.74 | <0.2 |
| MgP w. 60% salt | <0.01 | <0.02 | <0.05 | <0.5 |
| MgP w. 70% salt | <0.01 | <0.02 | <0.06 | <0.5 |
| ZrP w. 20% ash | <0.02 | 0.04 | 0.55 | <0.1 |
| Regulatory Limits | 1 | 5 | — | 5 |

Immersion Detail

Immersion studies indicate that the phosphate waste forms are durable in aqueous environments. Samples were immersed in distilled water and periodically the water was replenished to compensate for evaporation loss. Periodic measurements were made whereby the samples were removed from the water, dried and weighed to observe any weight loss. The pH of the water was also measured. At the end of 90 days, specimens were tested for compression strength. Results of weight change, pH and compression strength of Mg-phosphate ash waste forms at the end of 90 days are shown in FIGS. 2–4, respectively.

Figure 2:
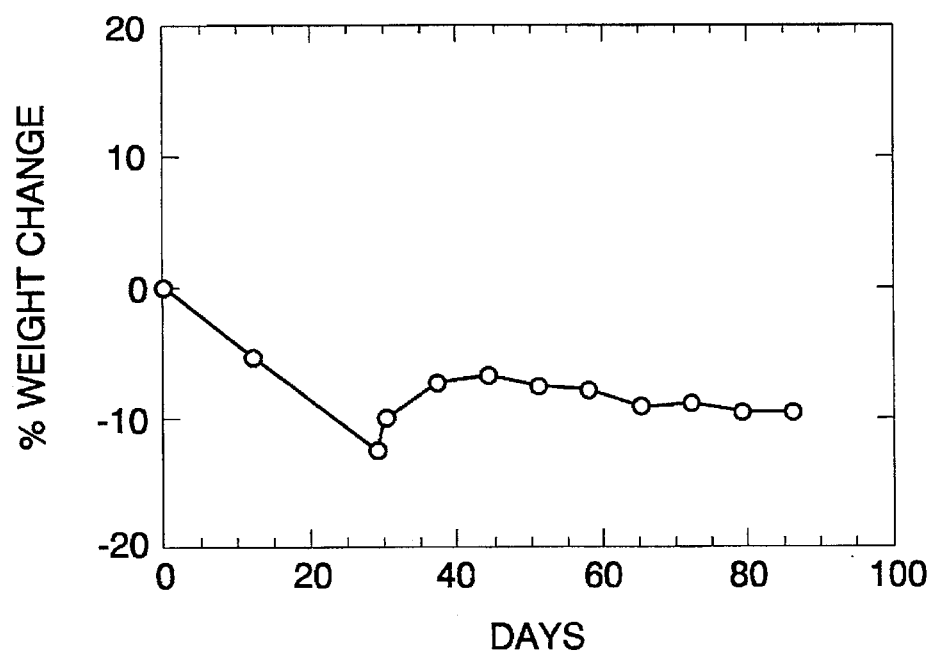
FIG. 2 is a graph depicting weight changes in an exemplary waste form during immersion, in accordance with the features of the present invention.

FIG. 2 shows the weight change of Mg-phosphate specimens with 70 weight percent ash waste loading after 90 days immersion compared to the weight of the waste form at the beginning of the immersion study. After an initial weight loss, probably due to the release of free phosphoric acid and unreacted MgO, the waste form stabilized.

Figure 3:
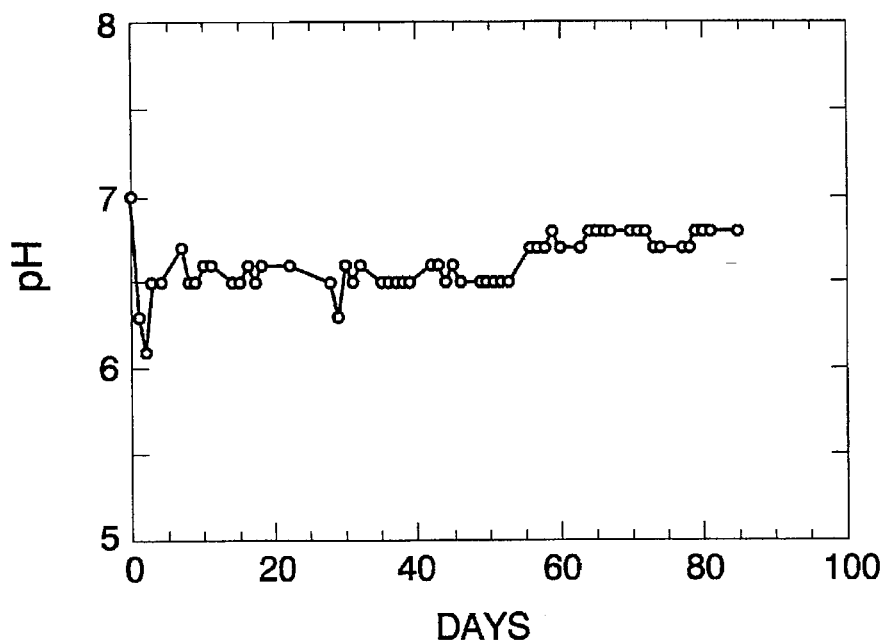
FIG. 3 is a graph depicting variation of pH in immersion water for an exemplary waste form, in accordance with the features of the present invention.

FIG. 3 depicts pH changes, with the curve depicted therein similar to that of FIG. 2. The initial drop in pH is again due to phosphoric acid release, with a later rebound due to the slower release of MgO. Once the excess acid and unreacted MgO were completely released, the pH and weight of the waste form stabilized.

Figure 4:
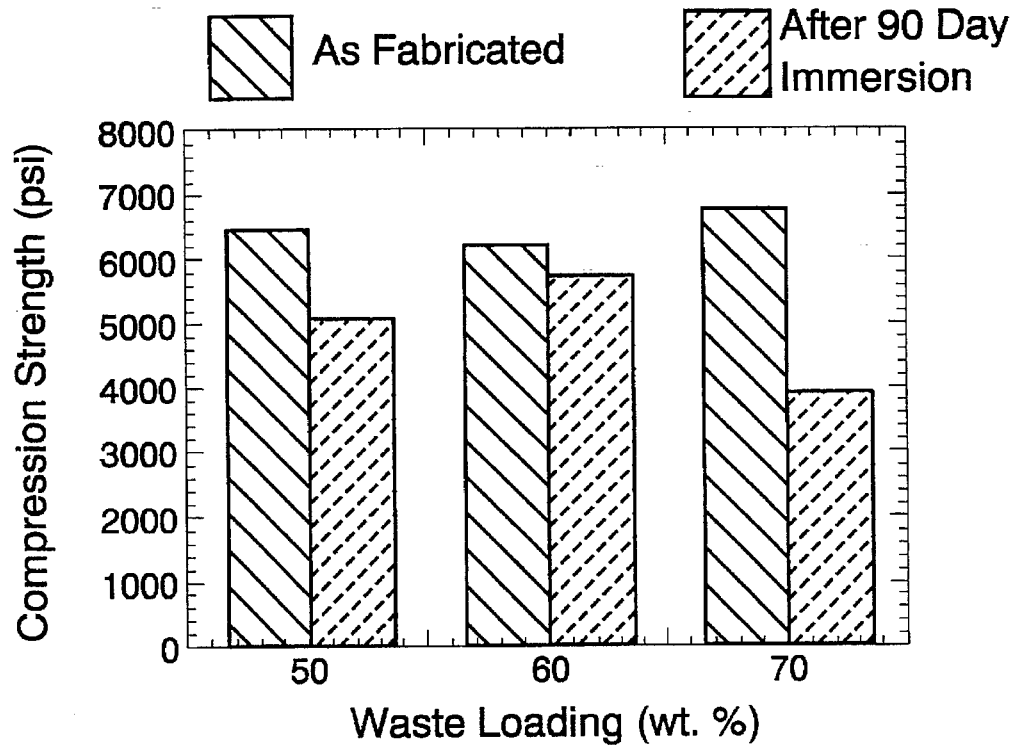
FIG. 4 is a graph depicting variation in compression strength for an exemplary waste form before and after immersion, in accordance with the features of the present invention.

FIG. 4 shows the variation in the compression strength of the Mg-Phosphate waste forms as a function of waste loading. For comparison purposes, the strength of just-fabricated Mg-phosphate waste forms that were not exposed to water is presented. FIG. 4 shows that all of the Mg-phosphate waste forms exhibited excellent strength viz the 500 psi requirements for land-fill final forms. The resultant strength of all of the waste forms was exceptionally good and satisfied the regulatory requirements after a 90-day exposure in an aqueous environment.

Microstructure and Reaction Mechanism

The structure of the final waste forms is complex. Scanning Electron Microscope (SEM) analysis reveals that the room-tempera-ture stabilized Mg-phosphate ash waste forms are both crystalline and noncrystalline. Both crystalline and noncrystalline phases contain Mg phosphates and silicates, perhaps evidence of the presence of phosphosilicate structures.

X-ray diffraction analysis done on ash waste forms of Mg and Zr phosphate suggest that Mg phosphate waste forms contain unreacted MgO while the reaction in Zr phosphate is complete. The formation of phosphate phases is due to a MgO surface reaction with phosphoric acid, wherein the core portion of the MgO grains remains unscathed.

The major crystalline phase observed in the Mg phosphate system is Newberyite ($MgHPO_4.3H_2O$), an insoluble stable phase. The major phase in Zr phosphate is either zirconium phosphate or a hydrophosphate of zirconium.

The fact that the compression strength of the ash waste forms in Mg phosphate systems does not depend on the extent of ash loading indicates that ash waste itself participates in the stabilization process. NMR studies reveal that ash loading modifies the mineralogy of the Mg phosphate matrix. Such a result makes the Mg phosphate system very suitable for stabilization of ash waste streams.

SEM analysis of Mg phosphate ash waste forms indicates that contaminates in the final waste forms are well dispersed both in the crystalline and well as noncrystalline phases. These data coincide with the results obtained by the inventors whereby any variations in the formulations of crystalline or noncrystalline phases due to variations in waste stream composition will not effect contaminant distribution. Generally, the inventors found that the phosphate waste resins microencapsulate contaminants very effectively in a homogeneous distribution in a complex matrix.

EXAMPLE 1

Magnesium Phosphate Ceramic

Magnesium oxide powder of approximately 8 micron size was first calcined for one hour at 1,300° C. 15 weight percent of boric acid was added to this powder and mixed well. The mixture was then reacted with 50 weight percent dilute phosphoric acid. The addition was done slowly by constantly stirring the powder into the solution. The resulting paste was either put in a mold to set or was pressed into a hard ceramic during its setting.

To make a waste form, ash surrogate waste in powder form (with particle size of approximately 8 microns) was added to the oxide powder. The ratio of powder to the waste was 65:35 by weight in this test. The surrogate waste used in these experiments was a mixture of fly ash (Class F), coal cinder ash and vermiculite as the major component, and activated carbon as a minor component. The fly ash content was 40 weight percent, coal cinder ash 33 weight percent and vermiculite content was 20 weight percent. Thus, these three constituents formed 93 weight percent of the total surrogate composition. Trace contaminants used were RCRA metal nitrates and organics. The concentrations of the metal nitrates were such that the metal concentration in the surrogate waste was 0.5 weight percent of each metal. Each of the organics was also 0.5 weight percent of the final waste form.

The samples were cured for at least one week. They were subjected to various tests. They were found stable in water immersion tests. Their strength was 2,923 psi and concentrations of heavy metals in TCLP test leachates were 1.64 ppm of Cd, 0.05 ppm of Cr, 9.63 ppm of Ni and <0.1 ppm of Pb. These values are well below the EPA's pass/fail tests for Cd, Cr and Pb of 1 ppm, 5 ppm and 5 ppm, respectively. The levels for organics were below the detection limit of 5 ppm for both naphthalene and dichlorobenzene. In as much as the minimum compression strength for a waste form is 500 psi, the magnesium phosphate waste forms generated herewith the invented method exceeds such requirement.

EXAMPLE 2

Magnesium Sodium Phosphate

The starter MgO powder was washed with 0.28M nitric acid solution, then by distilled water and dried. Considerable amounts of hydroxide was formed in the powder as a result of the washings and this hydroxide reacted with acids to form phosphates. Beyond this, the procedure followed herein was the same as that in Example 1. The compressive strength observed was 2561.4 psi and TCLP results were 0.03 ppm for Cd, 0.05 ppm for Cr, 0.05 ppm for Ni and <0.1 ppm for Pb. The levels of organics in the leachate were below <5 ppm for both dichlorobenzene and naphthalene. These results show that the magnesium sodium phosphate waste form meets regulatory requirements.

EXAMPLE 3

Zirconium Phosphate

Zirconium hydroxide was the starter powder used. It was reacted with 90 wt % concentrated (or 10 wt % diluted) phosphoric acid. The reaction yielded a paste which took approximately 3 weeks to set into a hard ceramic. The waste form was prepared by the method given in Example 1 and the same test procedures were followed. Compression strength was 6781.6 psi, the levels in the leachate for Cd, Cr, Ni and Pb were 0.07 ppm, 0.16 ppm, 11 ppm and <0.1 ppm. The levels for organics were <5 ppm. This shows that Zr-phosphate waste forms meet regulatory requirements.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for using phosphate ceramic material to stabilize solid and liquid waste at room temperature comprising:

a) grinding the solid waste to a predetermined particle size;

b) combining the now ground solid waste with a starter oxide to obtain a powder;

c) contacting the powder with phosphate-containing solution to create phosphates of the oxide in a slurry, said solution containing the liquid waste;

d) mixing the slurry while maintaining the slurry below a predetermined temperature;

e) shaping the now-mixed slurry into a predetermined form; and f) allowing the now-formed slurry to set into a phosphate ceramic waste form to chemically and physically encapsulate the solid and liquid waste.

2. The method as recited in claim 1 wherein the solid waste is selected from the group consisting of ash, cement, salts, medical waste, or combinations thereof.

3. The method as recited in claim 1 wherein the predetermined particle size is selected from the range between approximately 4 and 75 micrometers.

4. The method as recited in claim 1 wherein the starter oxide is selected from the group consisting of calcined MgO, crushed dibasic Na phosphate crystals mixed with calcined MgO, crushed dibasic $NH_4$ phosphate mixed with calcined MgO, $Al(OH)_3$, $Zr(OH)_4$, CaO, iron oxide, or combinations thereof.

5. The method as recited in claim 1 wherein the oxide powder and the solid waste is combined at a predetermined weight percent ratio of oxide powder to solid waste of from between approximately 15:85 to 50:50.

6. The method as recited in claim 1 wherein the acid solution contains 10 to 50 percent water.

7. The method as recited in claim 1 wherein the predetermined temperature is 100° C.

8. A method for encapsulating and stabilizing waste containing cesium comprising:
   a.) combining the waste with $Zr(OH)_4$ to create a solid-phase mixture;
   b.) grinding said solid-phase mixture;
   c.) mixing phosphoric acid with the solid-phase mixture to create a slurry;
   d.) shaping the now-mixed slurry into a predetermined form;
   e.) subjecting the now-shaped slurry to pressure; and
   f.) allowing the now pressurized slurry to set.

9. The method as recited in claim 8 wherein the $Zr(OH)_4$ and the solid waste is combined at a predetermined weight percent ratio of $Zr(OH)_4$ to solid waste of from between approximately 20:80 to 50:50.

10. The method as recited in claim 8 wherein the solid-phase mixture is ground to a particle diameter selected from the range of between approximately 4 microns and 75 microns.

11. The method as recited in claim 8 wherein the phosphoric acid is 10 percent to 50 percent diluted.

12. The method as recited in claim 8 wherein the slurry is subjected to a pressure of between approximately 1,000 psi and 2,000 psi.

13. A method for stabilizing liquid waste comprising:
   a.) supplying a powder containing magnesium, sodium and phosphate in predetermined proportions;
   b.) mixing said powder with the liquid waste to produce a slurry;
   c.) forming the slurry into a predetermined shape; and
   d.) allowing the now-shaped slurry to set.

14. The method as recited in claim 13 wherein the powder is a mixture of MgO and crystals of a dibasic phosphate in a weight percent ratio selected from a range of between approximately 87:13 and 77:23.

15. The method as recited in claim 14 wherein the dibasic phosphate is selected from the group consisting of ammonium phosphate, sodium phosphate or combinations thereof.

16. The method as recited in claim 13 wherein the liquid waste is mixed with an acid solution.

17. The method as recited in claim 16 wherein the acid solution contains phosphoric acid.

18. The method as recited in claim 16 wherein the acid solution contains from 50 percent water to 63 percent water.

19. The method as recited in claim 13 wherein the liquid waste contains tritium.

20. A method as recited in claim 1 wherein the solid and liquid waste is low level mixed waste.

21. A method as recited in claim 1 wherein the solid and liquid waste is selected from the group consisting of pyrophorics, ash, organic compounds, volatiles such as mercury, lead, cadmium, chromium and nickel, and combinations thereof.

22. A method for using phosphate ceramic material to stabilize solid and liquid waste at room temperature comprising:
   a) grinding the solid waste to a predetermined particle size;
   b) combining the now ground solid waste with a starter oxide to obtain a powder;
   c) contacting the powder with phosphate containing solution to create phosphates of the oxide in a slurry, said solution containing the liquid waste;
   d) mixing the slurry while maintaining the slurry below a predetermined temperature;
   e) shaping the now-mixed slurry into a predetermined form; and
   f) allowing the now-formed slurry to set into a phosphate ceramic waste form, wherein the solid and liquid waste contains organics selected from the group consisting of polychlorinated biphenyls, dioxin, dichlorobenzene, naphthalene and combinations thereof.

23. The method as recited in claim 22 wherein the predetermined particle size is selected from the range between approximately 4 and 75 micrometers.

24. The method as recited in claim 22 wherein the starter oxide is selected from the group consisting of calcined MgO, crushed dibasic Na phosphate crystals mixed with calcined MgO, crushed dibasic $NH_4$ phosphate crystals mixed with calcined MgO, $Al(OH)_3$, $Zr(OH)_4$, CaO, iron oxide, or combinations thereof.

25. The method as recited in claim 22 wherein the oxide powder and the solid waste is combined at a predetermined weight percent ratio of oxide powder to solid waste of from between approximately 15:85 to 50:50.

26. The method as recited in claim 22 wherein the acid solution contains 10 to 50 percent water.

27. The method as recited in claim 22 wherein the predetermined temperature is 100° C.

* * * * *